United States Patent [19]

Carter

[11] 3,954,549

[45] May 4, 1976

[54] APPARATUS EMBODYING CONTINUOUS CONVEYORS FOR APPLYING LABELS TO CONTAINERS

[75] Inventor: Sidney T. Carter, Shrewsbury, Mass.

[73] Assignee: A-T-O Inc., Cleveland, Ohio

[22] Filed: July 31, 1974

[21] Appl. No.: 493,217

[52] U.S. Cl. .................................. 156/486; 156/580

[51] Int. Cl.[2] .......................................... B23K 27/00

[58] Field of Search ............................ 156/486–493, DIG. 36, 583, 580; 198/131, 179; 214/1 BA

[56] References Cited

UNITED STATES PATENTS

| | | | |
|---|---|---|---|
| 2,635,776 | 4/1953 | Cook et al. | 156/DIG. 36 |
| 3,300,365 | 1/1967 | Roos | 156/583 |
| 3,306,803 | 2/1967 | Holstein | 156/493 X |
| 3,590,982 | 7/1971 | Banyas | 198/179 |
| 3,663,336 | 5/1972 | Alkalay et al. | 156/489 X |
| 3,850,780 | 11/1974 | Crawford et al. | 156/583 |

*Primary Examiner*—William A. Powell
*Assistant Examiner*—David A. Simmons
*Attorney, Agent, or Firm*—Robert T. Gammons

[57] ABSTRACT

Apparatus for pressing labels against the lateral sides of containers traveling along a conveyor standing upright, wherein a plurality of wiper assemblies including pressure applying pads are arranged along opposite sides of a container conveyor for movement along paths parallel thereto characterized in that the assemblies are supported by horizontally moving conveyor chains entrained about spaced sprockets so as to have straight runs parallel to the path of movement of the container conveyor and curved end runs which respectively lead into the straight runs and away from the straight runs and wherein the assemblies are rotated relative to the conveyor as they travel around the end runs to establish and maintain full compressive engagement of the pads with the containers throughout movement of the pads along the straight runs from center to center of the supporting sprockets.

22 Claims, 31 Drawing Figures

APPARATUS EMBODYING CONTINUOUS CONVEYORS FOR APPLYING LABELS TO CONTAINERS

BACKGROUND OF INVENTION

There are currently labeling machines available wherein endless conveyor chains are arranged to move wiper assemblies along a container supporting conveyor for pressing labels against the sides of containers moving along with the container conveyor. The wiper assemblies approach the container conveyor around a sprocket at one end and leave it about a sprocket at the other end and the only pressure exerted is from the rubber pads of the wiper assemblies. The unidirectional movement of the wiper assemblies provides for high speed operation without undue vibration in contrast to the reciprocal type wiper assemblies, however, part of the travel between sprockets is used up to get the wipers into engagement with the containers and a part is used up to move them away so that they do not remain in engagement with the containers long enough to insure permanent sticking of the labels. Engagement of the wiper pads with the containers for a greater length of time could be provided for by employing larger sprockets and larger chains, however, this is objectionable because the ratio of the number of wiper assemblies engaged with the containers at any one time is high with respect to the number of wiper assemblies mounted on the chains and because the larger sprockets results in high speed around the ends which develops destructive centrifugal forces. The purpose of this invention is to provide a structure wherein the unidirectional movement of a conveyor chain type of wiper assembly supports and its advantage of high speed operation can be availed of with relatively small sprockets and short chains without sacrificing the length of the time that the wiper pads are in active compressive engagement with the containers; a structure which is designed to enable making adjustments of the wiper assemblies at opposite sides of the container conveyor and to maintain uninterrupted drive from a common source and to automatically maintain tautness in the conveyor chains.

SUMMARY OF INVENTION

Labeling apparatus comprising means for moving containers to be labeled in spaced relation along a predetermined path, a conveyor having a straight run parallel to the path and curved runs at its opposite ends, label pressing assemblies connected at intervals corresponding to the container spacing to the conveyor for movement with the conveyor around one end toward said path and around the other end away from said path, label pressing pads on the assemblies for pressing labels against the containers, drive means for advancing the conveyor and first means to move the label pressing pads into engagement with the containers as they travel along said path and then out of engagement therewith, cam means for rotating the label pressing assemblies to the conveyors as they travel around the one end toward said path so that as they approach said path the pads are moved perpendicularly toward said path and parallel thereto, and means for rotating the label pressing assemblies relative to the conveyor as they travel around the other end away from said path so that as they move away from said path the pads are moved parallel to said path and perpendicularly away therefrom. Pivotal movement of the wiper assemblies as they are moved around the end towards the container conveyor is initiated by said cam means as the wiper assemblies approach the curved runs, accelerated during approximately half of its travel around the ends and decelerated as it approaches the straight run to the speed of the straight run and as they move around the end away from the container conveyors pivotal movement is commenced after they leave the straight run, decelerated during approximately half of their travel around the end and as they approach the straight runs accelerated to the speed of the straight runs. At the one end the pads are rotated relative to the conveyor so as to lead the assemblies and at the other end they are rotated so as to lag the assemblies. At each end the pads travel in paths of shorter radius of curvature than if not so rotated. The conveyor comprises a pair of vertically spaced chains arranged to travel in horizontal planes about longitudinal spaced sprockets. The wiper assemblies are pivotally mounted on the chains and the cam means for effecting rotation of the wiper assemblies comprises followers on the wiper assemblies, and vertically spaced cam plates containing cam grooves with which the followers are engaged. There are wiper carrying conveyors along each side of the conveyor and there is means for adjusting these conveyors rectilinearly toward and from the container conveyor with means for providing uninterrupted, continuous delivery of power to the wiper carrying conveyors while making adjustments and means for adjusting the distance between the sprockets of the chains comprising each of the wiper conveyors.

The invention will now be described in greater detail with reference to the accompanying drawings, wherein.

Figure 27:
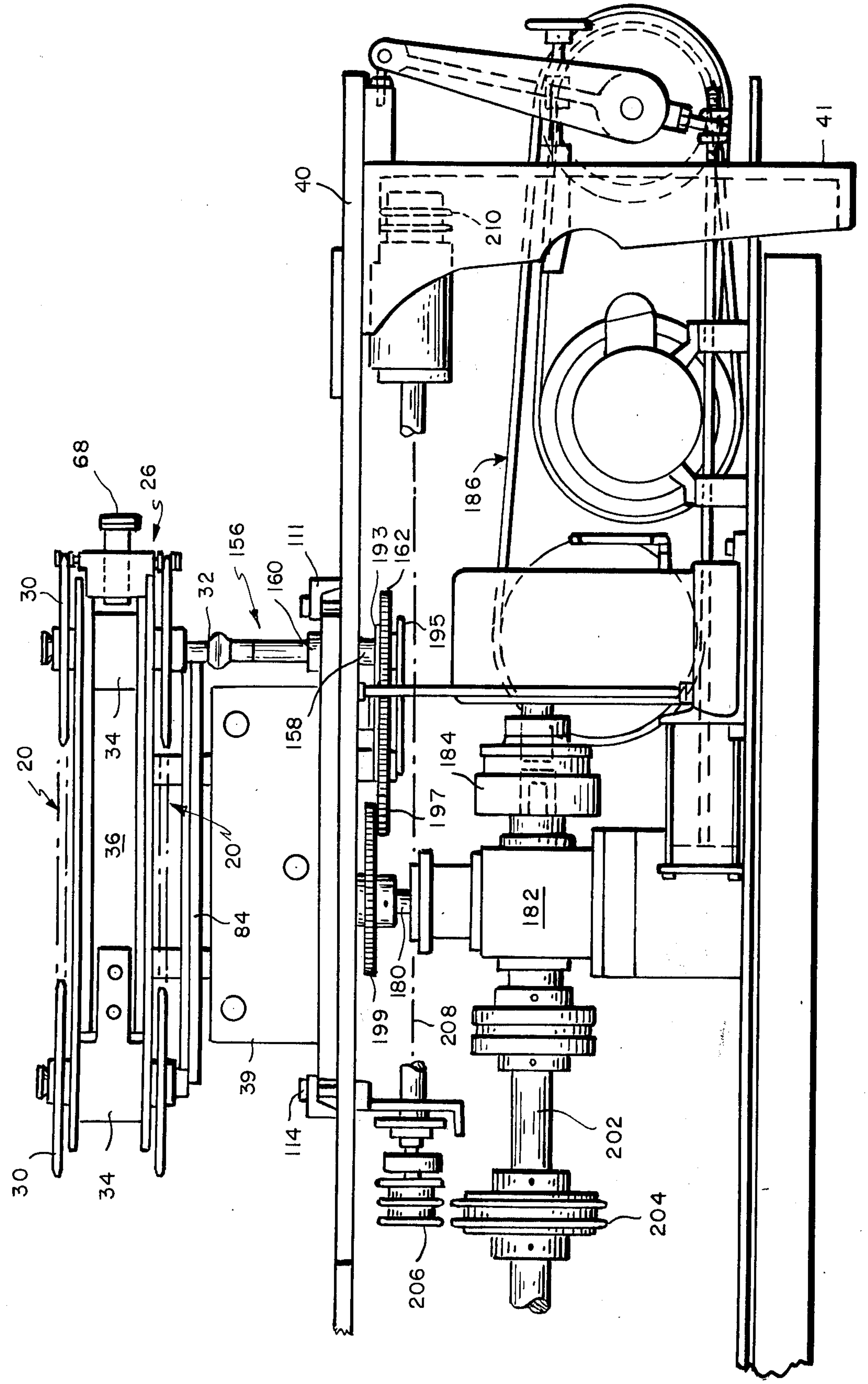
Figure 28:
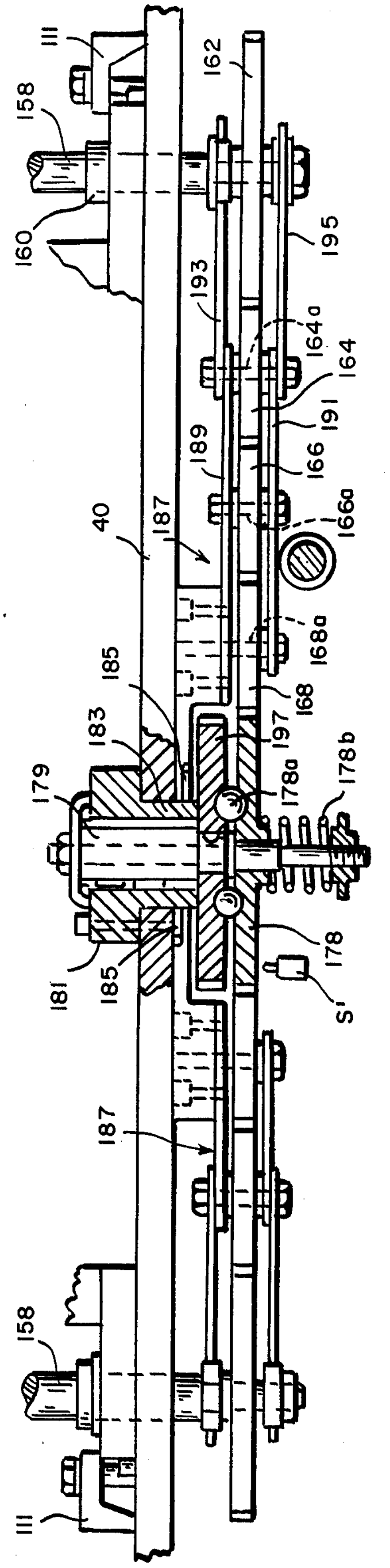
Figure 29:
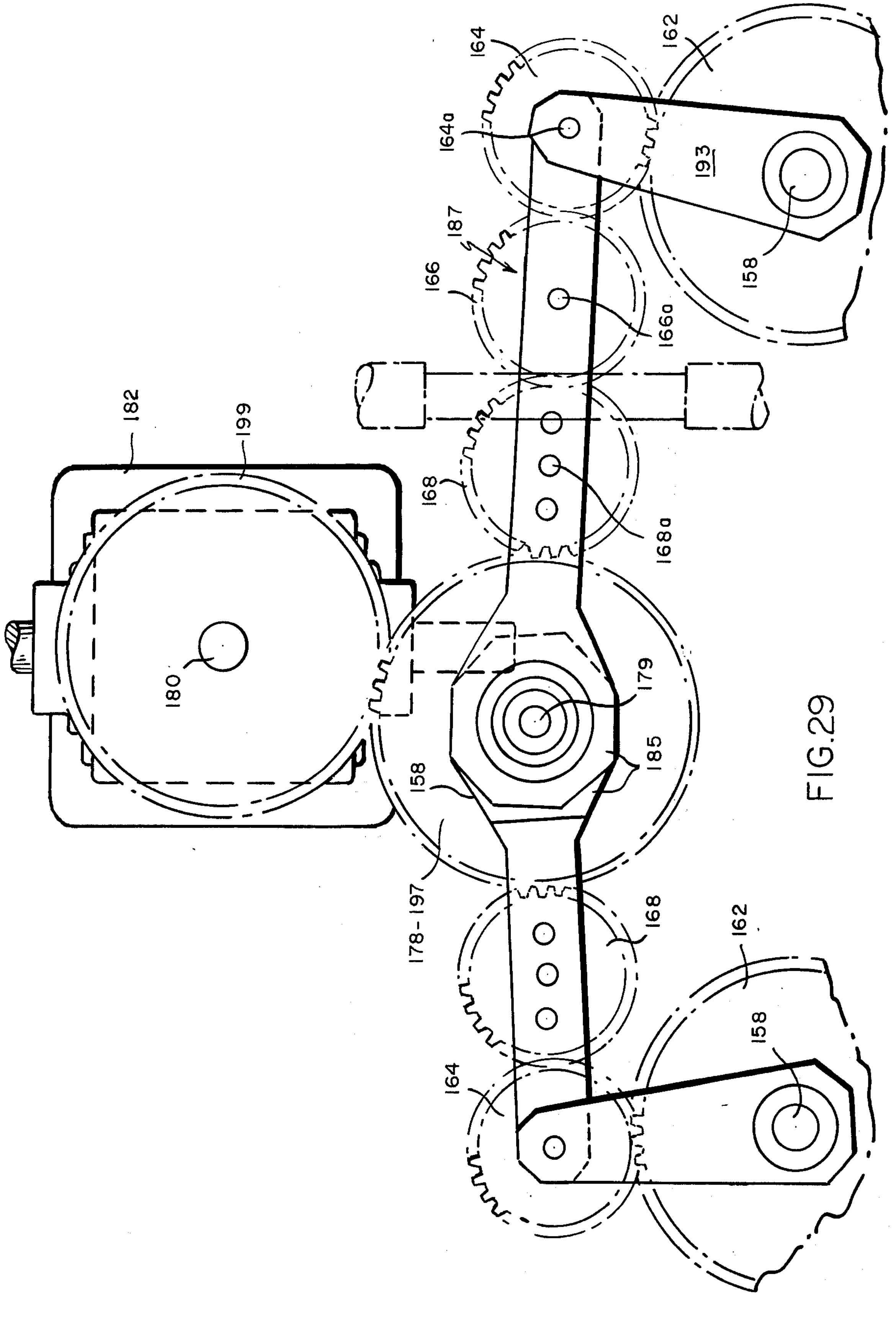

FIGS. 11 to 18 inclusive illustrate successive positions of a wiper assembly as it approaches the container conveyor;

FIGS. 19 to 26 inclusive illustrate the successive positions of a wiper assembly as it leaves the container conveyor;

FIG. 27 is an elevation at the right end of the machine showing in detail the drive from the main drive shaft to the conveyors which enables adjusting the conveyors toward and from opposite sides of the container conveyor while maintaining the driving relation therewith;

FIG. 28 is an elevation partly in section to much larger scale of the drive means shown in FIG. 27;

FIG. 29 is a plan view of FIG. 28, and

Figure 30:
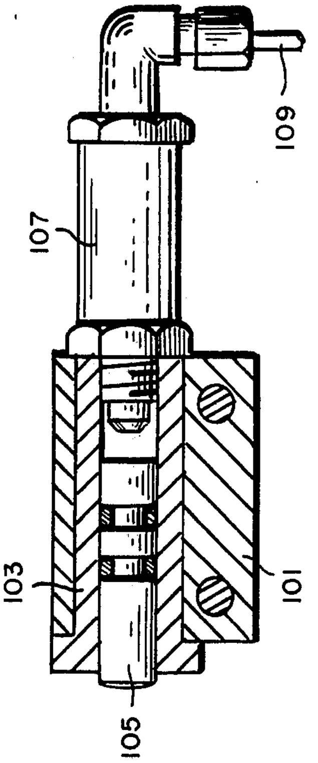

FIG. 30 is a detail partly in section of the means for automatically keeping the conveyor chains taut.

Figure 1:
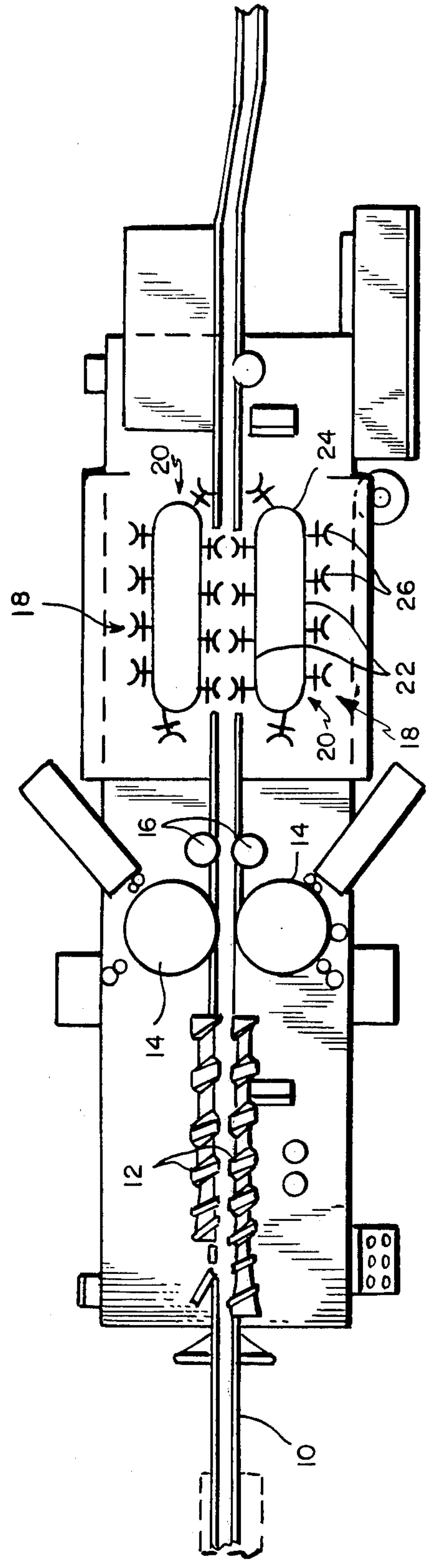
FIG. 1 is a plan view of the apparatus.
Figure 2:
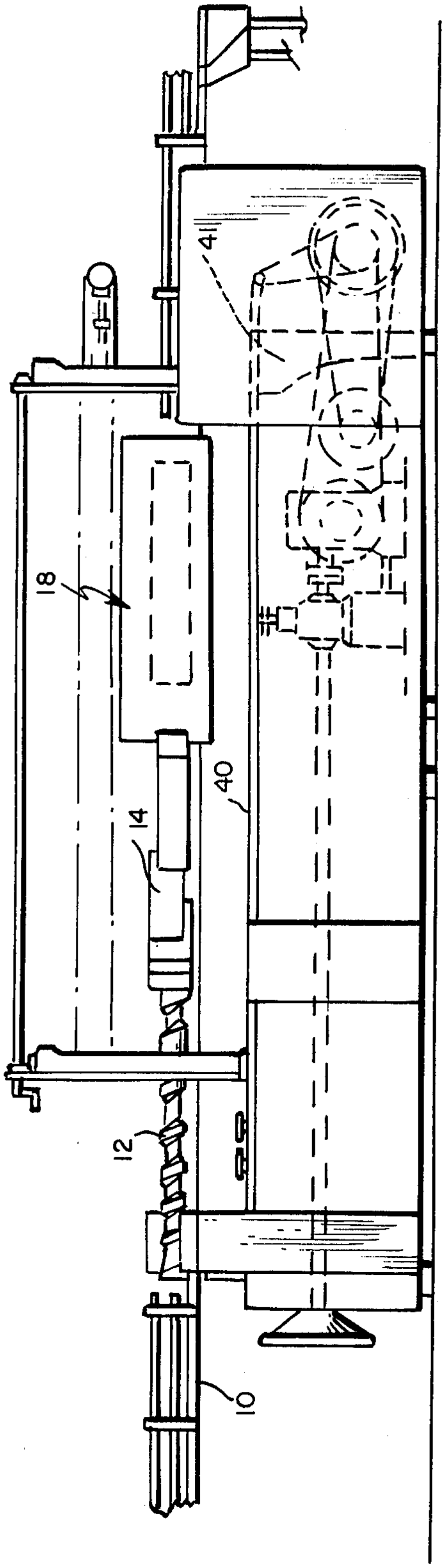
FIG. 2 is a side elevation of the apparatus.

Referring to the drawings, FIG. 1, there is shown label applying apparatus of the kind wherein containers which have been previously filled and closed are delivered to the receiving end of the conveyor 10 of a labeling apparatus and by the conveyor 10 to a pair of cooperating longitudinally extending feed screws 12—12 which spot the containers in properly spaced relation and properly oriented and to a pair of label applying turrets 14—14 which press labels to opposite sides of the containers as they travel between the turrets whereupon the containers with the labels spotted thereon are moved between successively arranged first and second wiper means 16—16 and 18—18. The constructions and arrangement of the feed screws 12—12, the label applying turrets 14—14, the means for supplying adhesive coated labels to the turrets and the first wiper means 16—16 are disclosed in my pending applications Ser. No. 315,795 filed Dec. 18, 1972, Ser. No. 337,579 filed Mar. 2, 1973, Ser. No. 346,125 filed Mar. 29, 1973, Ser. No. 414,816 filed Nov. 12, 1973 and my U.S. Pat. No. 3,806,114.

The second wiper means 18—18 which comprise the subject matter of this invention are mounted on the frame of the aforesaid labeling apparatus and provided with driving means for effecting their operation as will appear hereinafter in lieu of the oscillating type of wipers shown in U.S. Pat. Nos. 2,940,630 and 2,925,931. There are two sets of wiper means 18—18 arranged at opposite sides of the conveyor 10 of identical construction each of which is adapted to move a plurality of wiper assemblies along a path parallel to the container conveyor 10 and so constructed and arranged as to maintain the wiper assemblies in compressive engagement with the containers throughout the longitudinal movement of the containers long enough to insure pressing the labels into engagement with the containers and holding them in engagement therewith until they become securely adhered and to effect such application and securing of the labels to the containers in the shortest distance with the least number of assemblies. By reason of the construction and arrangement of the wipers as herein illustrated the wiping may be achieved at a rate of 600 to 850 containers per minute without appreciable vibration and/or destructive wear of the moving parts.

Figure 3:
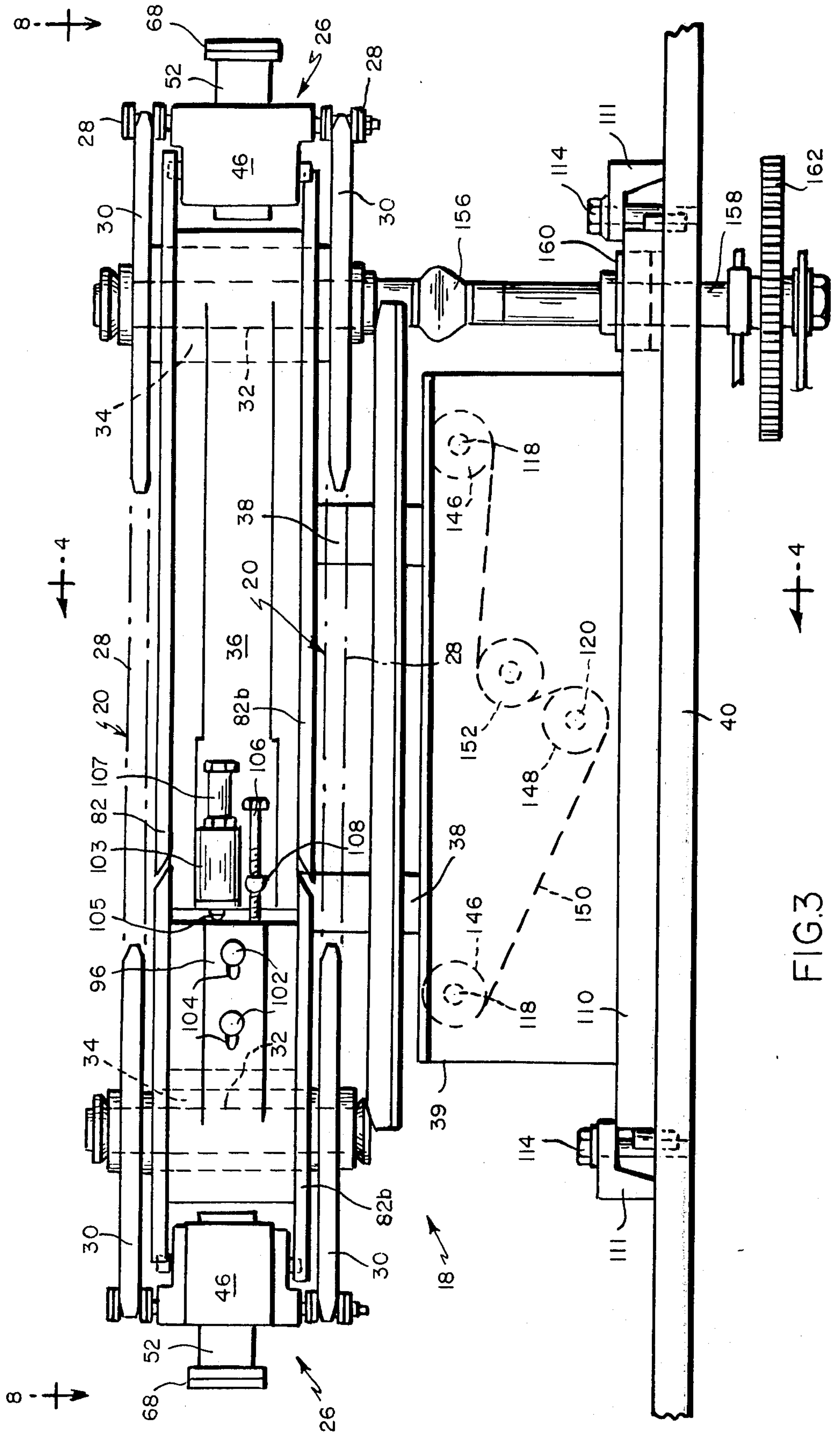
FIG. 3 is an elevation taken at one side of the apparatus and to much larger scale showing the conveyor structure for the wiper assemblies.
Figure 8:
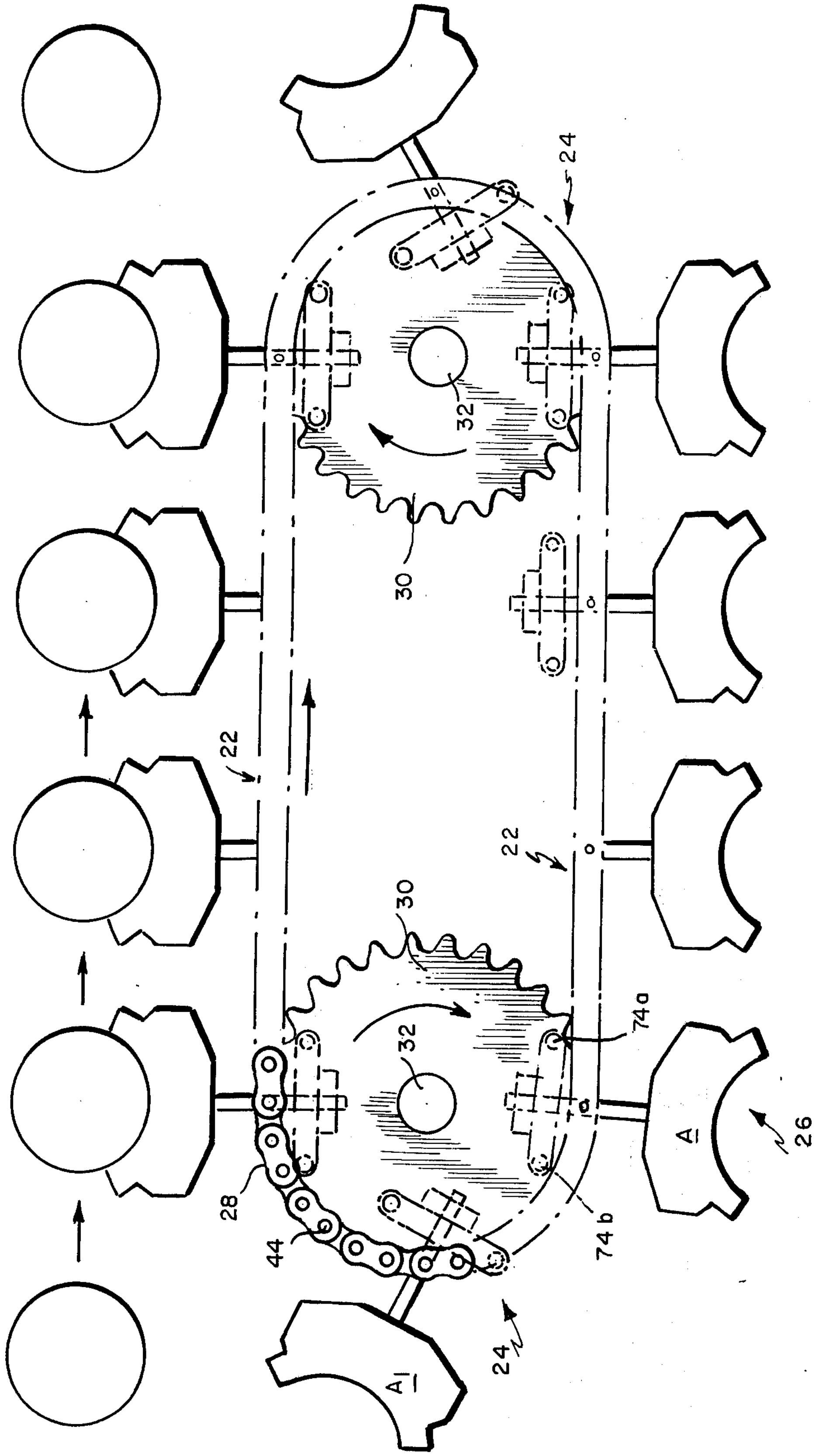
FIG. 8 is a plan view taken in a horizontal plane, substantially on the line 8—8 of FIG. 3.

Referring to FIGS. 2, 3, 4 and 8 the wiper means 18 at each side of the container conveyor 10 comprises conveyors 20—20 provided with longitudinally extending spaced parallel straight runs 22—22 and curved end runs 24—24 illustrated diagramatically in FIGS. 1 and 8, arranged to travel in horizontal planes and a plurality of wiper assemblies 26 pivotally mounted on the conveyors for movement along the straight and curved runs to move the assemblies around one end of the conveyor towards the container conveyor 10 and around the other end away from the container conveyor 10 and during their movement between the ends along a path parallel to the container conveyor 10 and in compressive engagement with containers resting on the container 10. Each conveyor 20, FIGS. 3, 5 and 6, comprises a link chain 28 entrained about longitudinally spaced sprockets 30—30 mounted on vertically disposed shafts 32—32. The shafts 32—32 are journaled in suitable bearings 34—34 on a frame member 36 supported on longitudinally spaced legs 38—38 which in turn are supported by frame members 39—39, FIGS. 3 and 4, mounted on a table 40 for adjustment of the wiper means towards and from the container conveyor 10. The table 40 is supported from the floor by legs 41, FIGS. 2 and 27, to provide beneath it space for the driving mechanism. The shaft 32 at the right end, as illustrated in FIG. 3, is rotated by means which will be described hereinafter, while that at the left end is free to rotate in its bearing 34.

Figure 6:
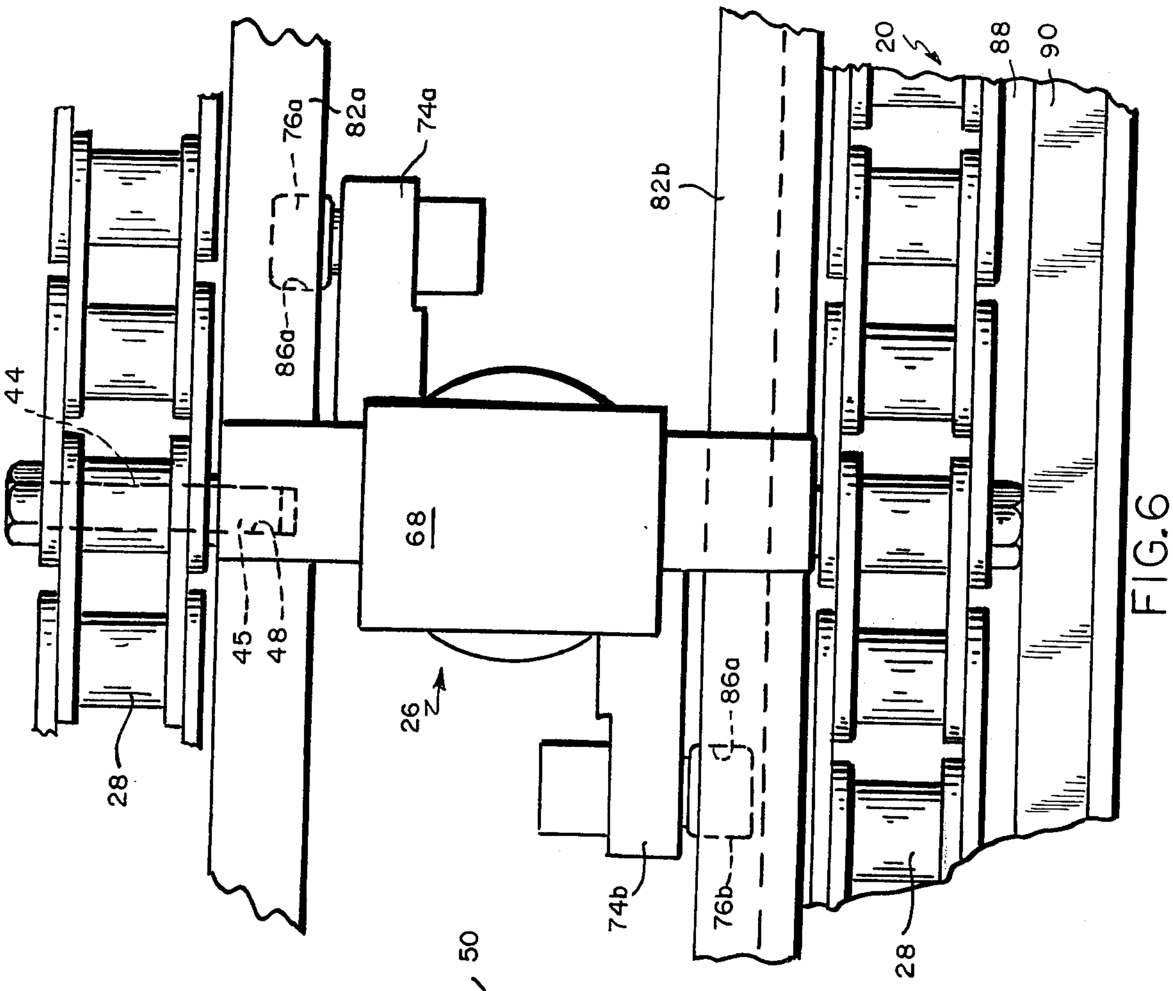
FIG. 6 is a view taken on the line 6—6 of FIG. 5.
Figure 5:
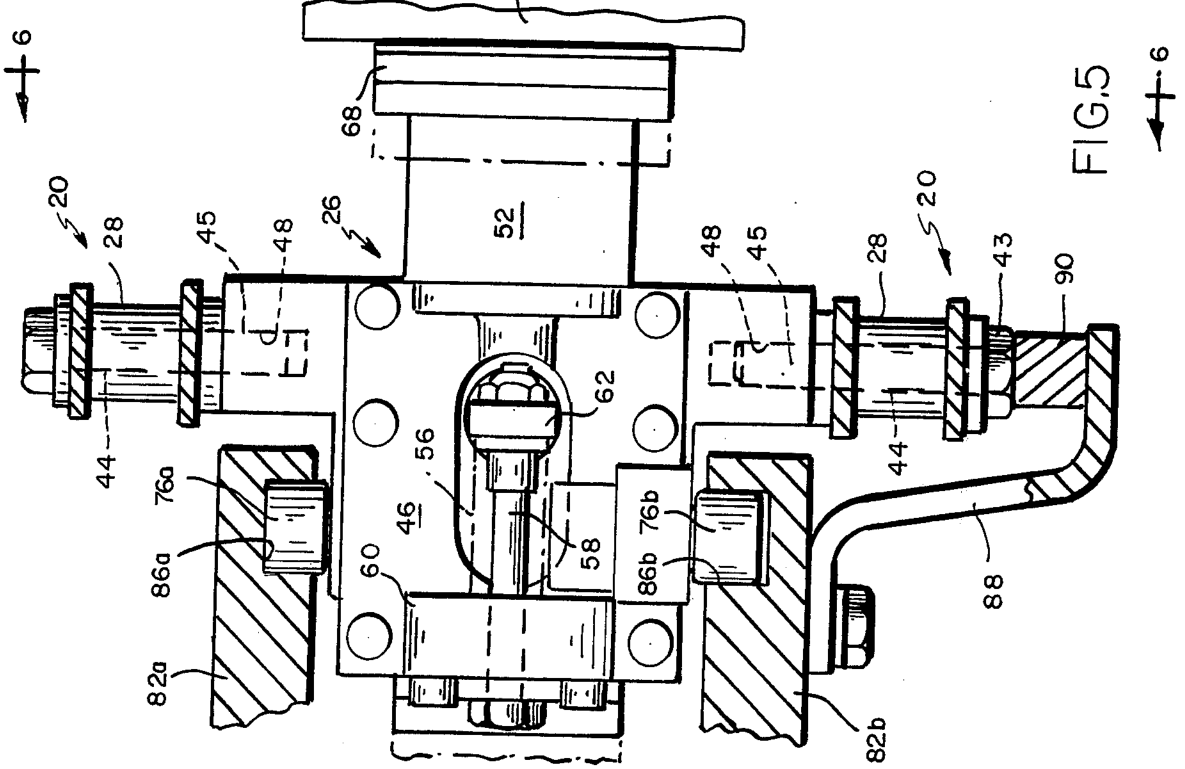
FIG. 5 is a side elevational view of a wiper assembly mounted on a conveyor.
Figure 7:
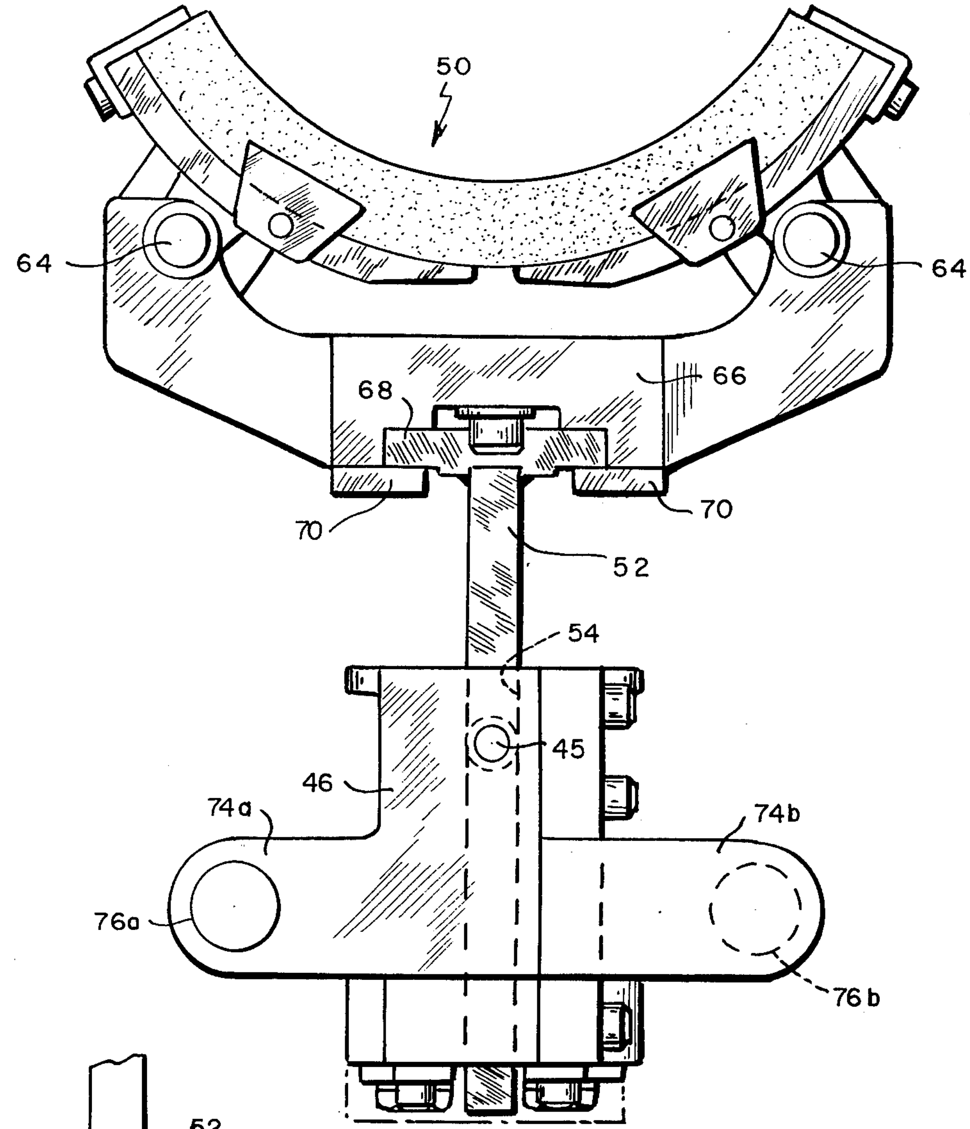
FIG. 7 is a plan view of a wiper assembly.
Figure 5A:
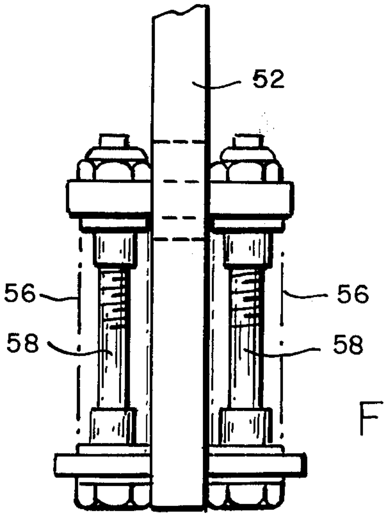
FIG. 5A is a fragmentary section taken on the line 5a—5a of FIG. 5.

At uniformly spaced intervals lengthwise of the chains 28—28 the pivot pins 44, FIGS. 5 and 8, which connect adjacent links of the link chains are provided with extensions 45 which extend downwardly and upwardly respectively from the upper and lower chains and in alignment for pivotally supporting the wiper assemblies 26. Each assembly as shown in FIGS. 5, 6 and 7 comprise a mounting block 46 containing upper and lower vertically disposed openings 48—48 for receiving the extensions 45 of the pins 44. Each mounting block has mounted on it a label pressing pad 50, FIG. 7, supported at the end of an arm 52, said arm being of rectangular cross section and slidably mounted in a rectangular opening 54 provided in the mounting block 46. The mounting blocks 46 are mounted on the chains with the pads 50 facing outwardly with respect to the paths of travel and these pads are held distended relative to the mounting blocks by compression springs 56—56, FIGS. 5 and 5A, mounted on supporting bolts 58 the opposite ends of which are respectively engaged with bosses 60 on the mounting blocks and bosses 62 affixed to the bolts 58. The pads 50 are of articulated construction, FIG. 7, and are pivotally mounted for pivotal movement about vertical pins 64—64 journaled in the ends of a yoke 66 which in turn is mounted on the distal end of the arm 52 by means of an adapter plate 68 vertically adjustable in ways formed by gibs 70—70 attached by screw bolts to the yoke. The construction and operation of the wiper pads is disclosed in my U.S. Pat. No. 2,940,630 and in the pending application of Edward A. Schnier, Ser. No. 406,334, filed Oct. 15, 1973 and may be referred to for a more detailed description of the structure involved.

Each mounting block 46 has upper and lower laterally extending vertically spaced arms ***74a*, *74b*, FIGS. 6 and 7, spaced inwardly relative to the chains at the ends of which there are cam follower rolls *76a*, *76b*.**

The wiper assemblies as they are moved in translation by the chains along the straight and curved runs are guided and are rotated relative to the chain as they travel around the ends by upper and lower cam plates ***82a*, *82b*, FIGS. 3, 4, 5 and 6, secured to the upper and lower sides of the frame member 36. The cam plates contain grooves *86a*, *86b* within which are engaged the rolls *76a*, *76b*. The lower cam plate *82b* has bolted to its underside bracket members 88 which support a rail 90 at the underside of the lower conveyor chain 28 along the straight runs in engagement with the heads 43 of the pins 44** in the lower chain so as to support the chains and the wiper assemblies for movement in a horizontal plane.

The grooves ***86a*, *86b* have courses which are parallel to the straight runs of the chains so that while the wiper assemblies are moving along the straight runs the wiper assemblies are held so as to project substantially right angularly from the chains and so that while traveling along the path of movement of the conveyor 10 the pads continuously press the labels against the containers. The cam follower rolls 76***a*, 76*b* by engagement within the cam grooves 86*a*, 86*b* support the straight runs of the chains against displacement as the wipers travel along the straight runs in compressive engagement with the containers. By suitable adjustment of the wiper means toward or away from the conveyor 10, as will be described hereinafter, the pressure that the pads will apply to the labels can be adjusted according to the size of the label and the viscosity of the adhesive.

Figure 10:
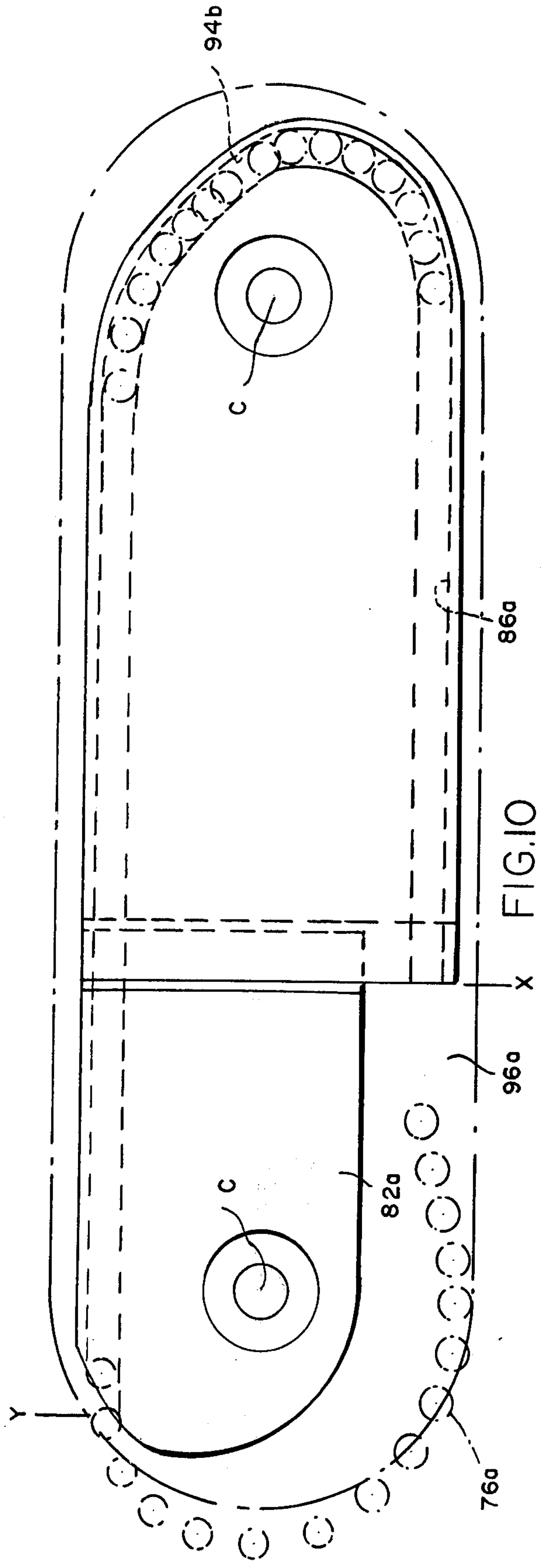
FIG. 10 is a plan view of the top cam plate which guides the wiper assemblies as they leave the container conveyor.
Figure 9:
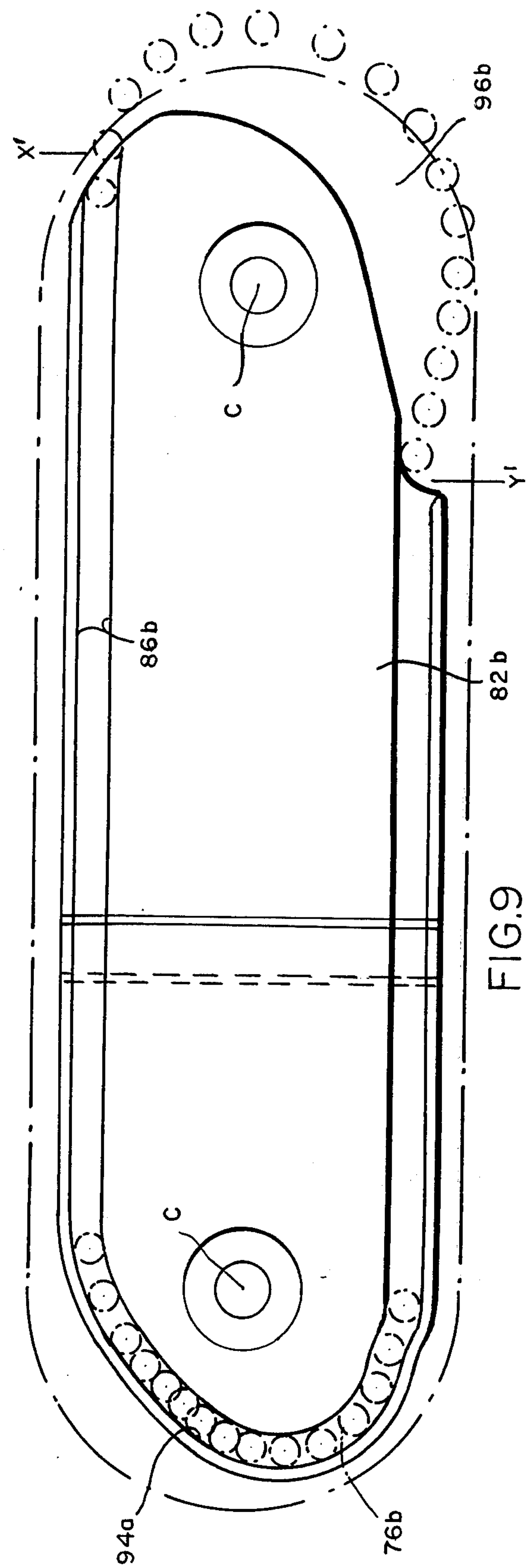
FIG. 9 is a plan view of the bottom cam plate which guides the wiper assemblies as they approach the container conveyor.
Figure 11:
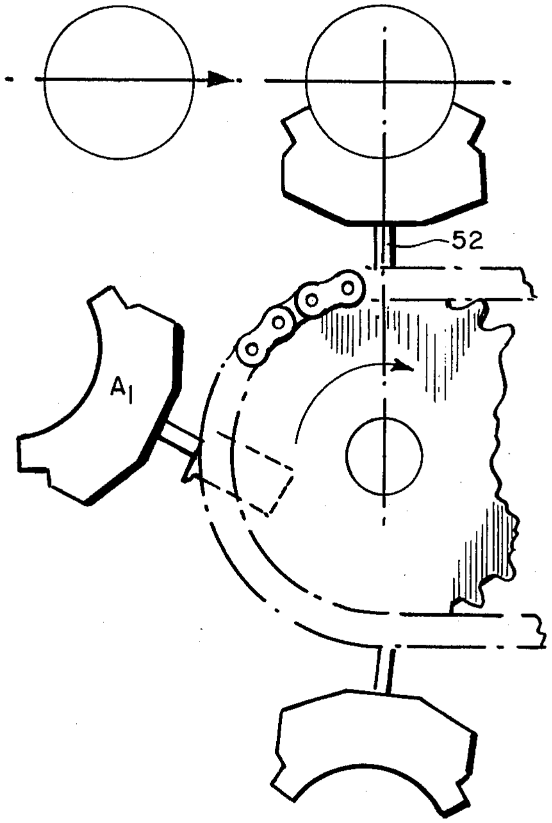
Figure 12:
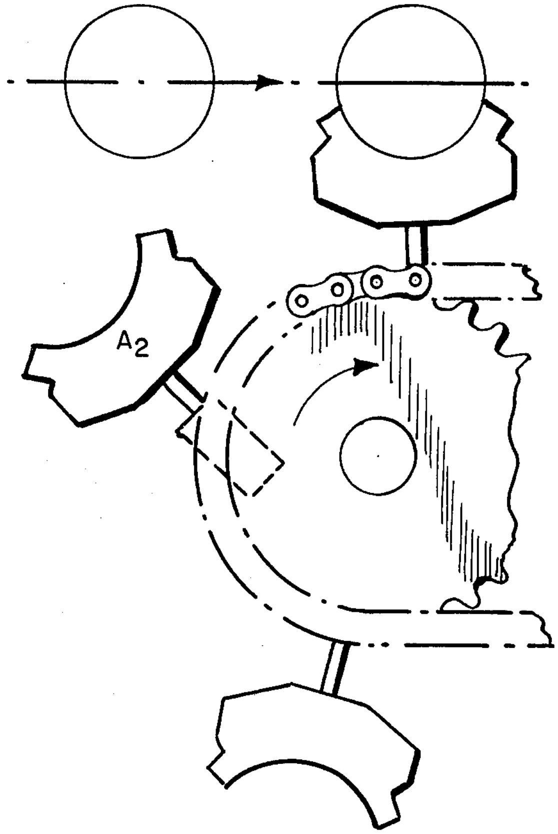
Figure 13:
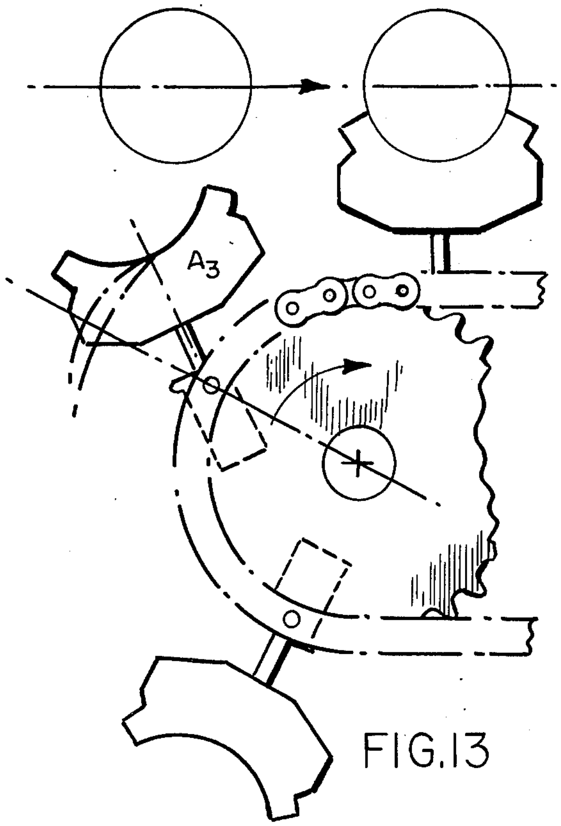
Figure 14:
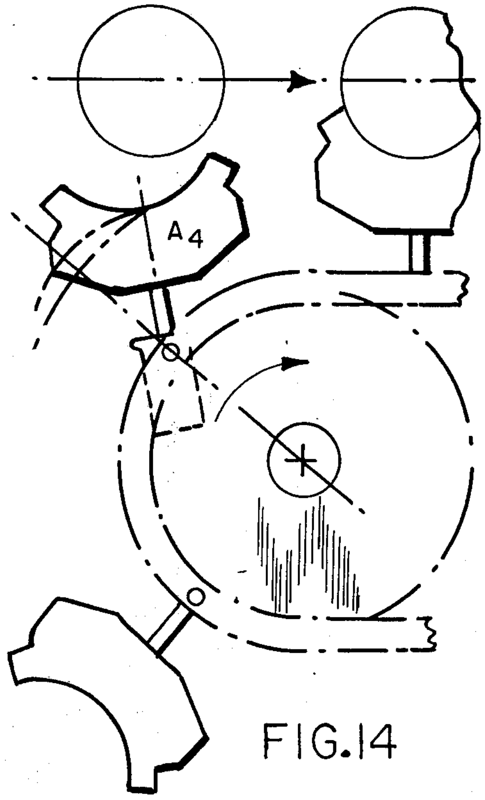
Figure 15:
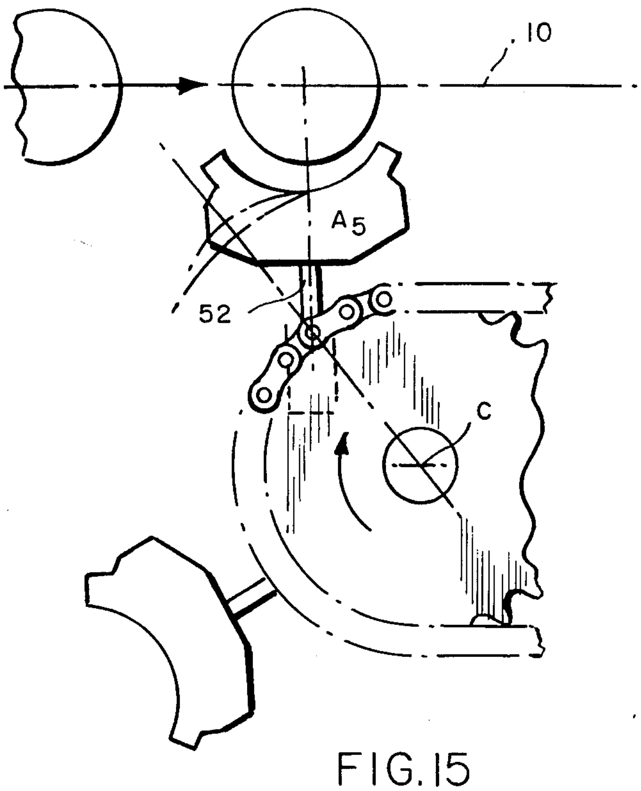
Figure 16:
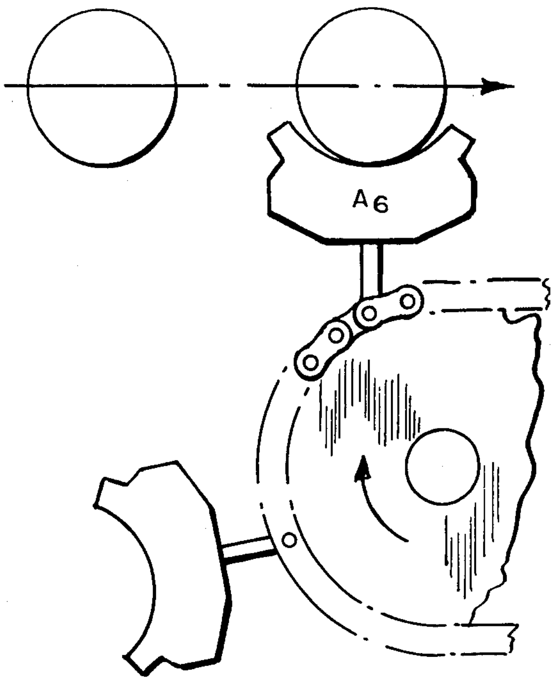
Figure 17:
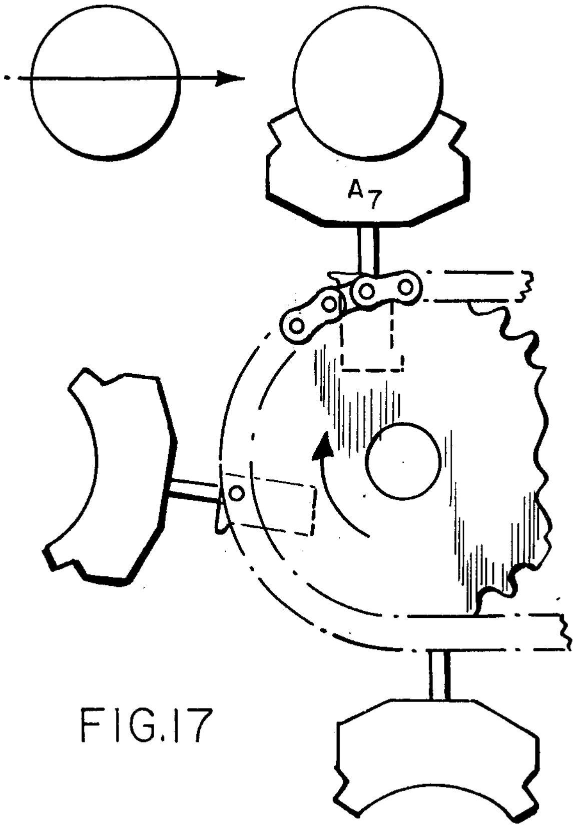
Figure 18:
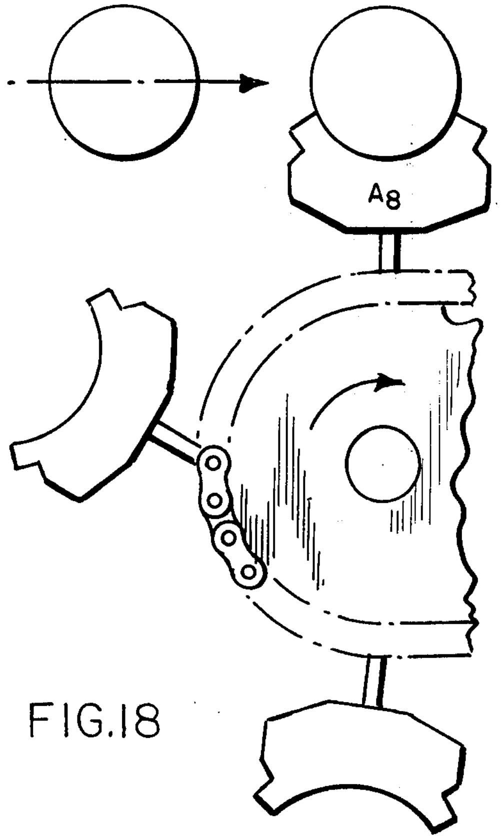
Figure 19:
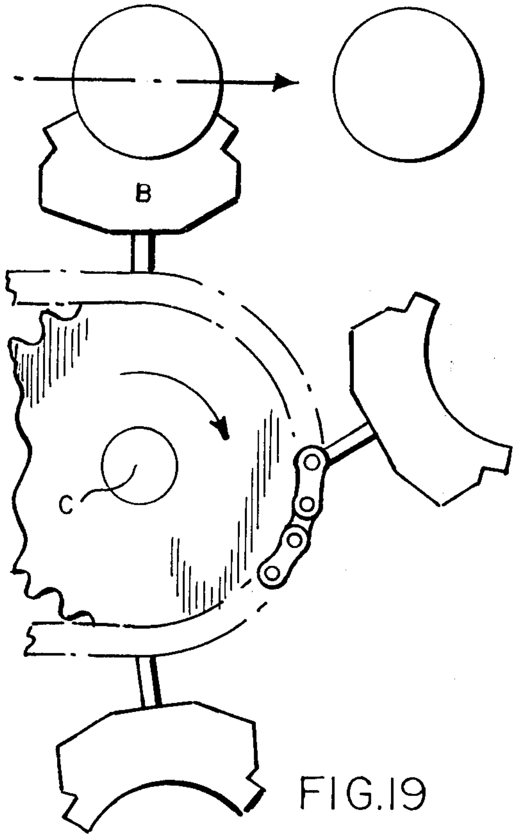
Figure 20:
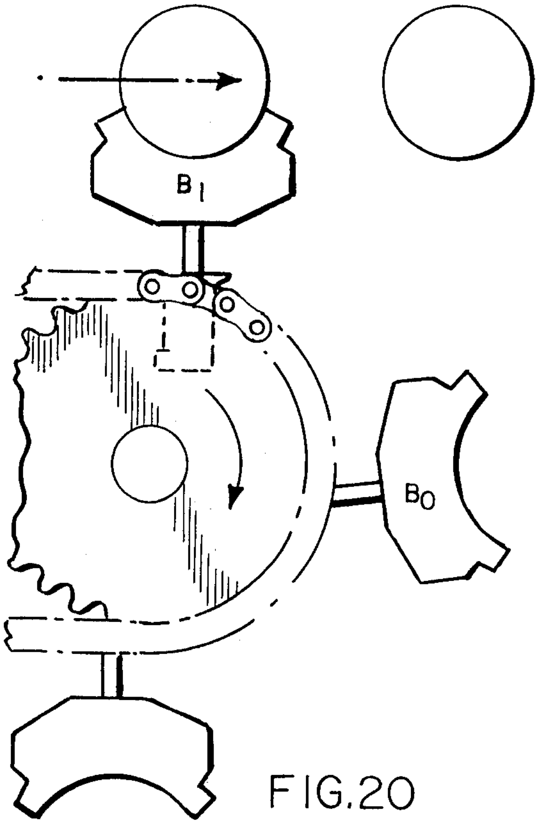
Figure 21:
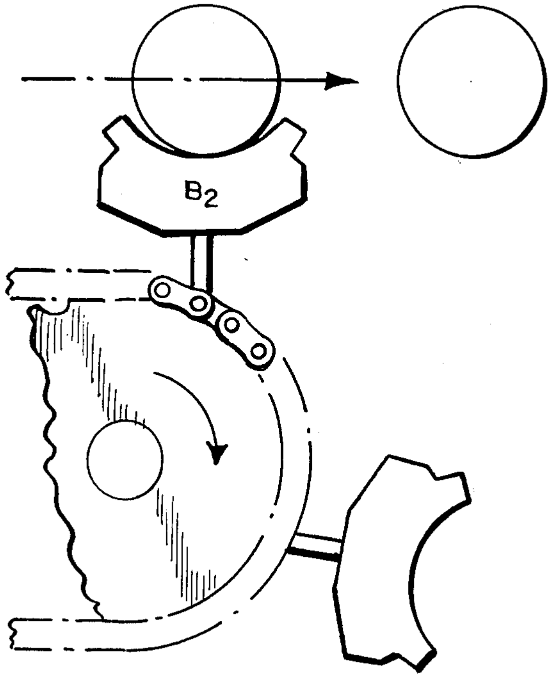
Figure 22:
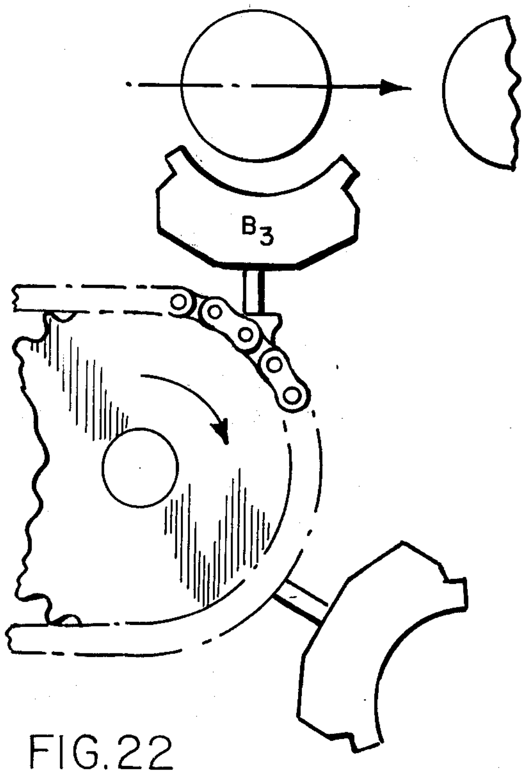
Figure 23:
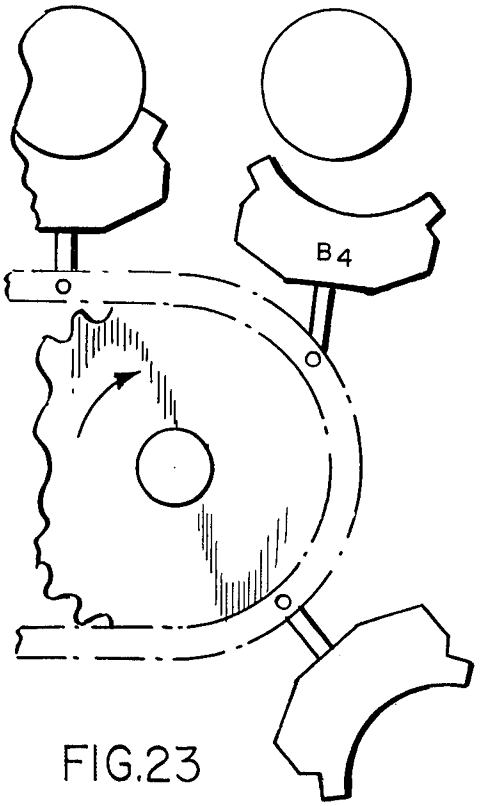
Figure 24:
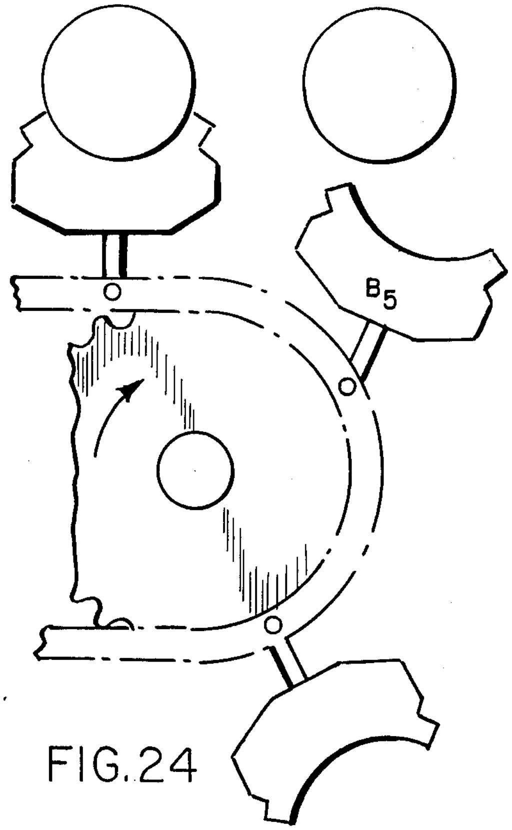
Figure 25:
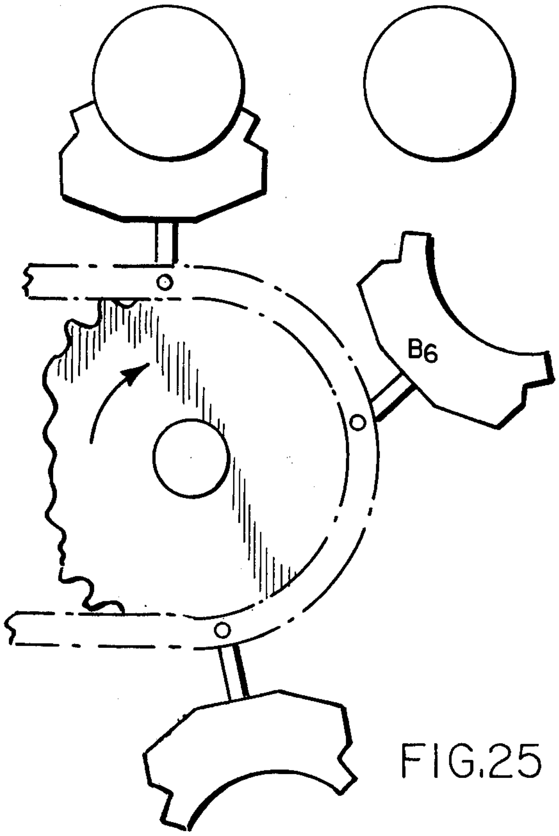
Figure 26:
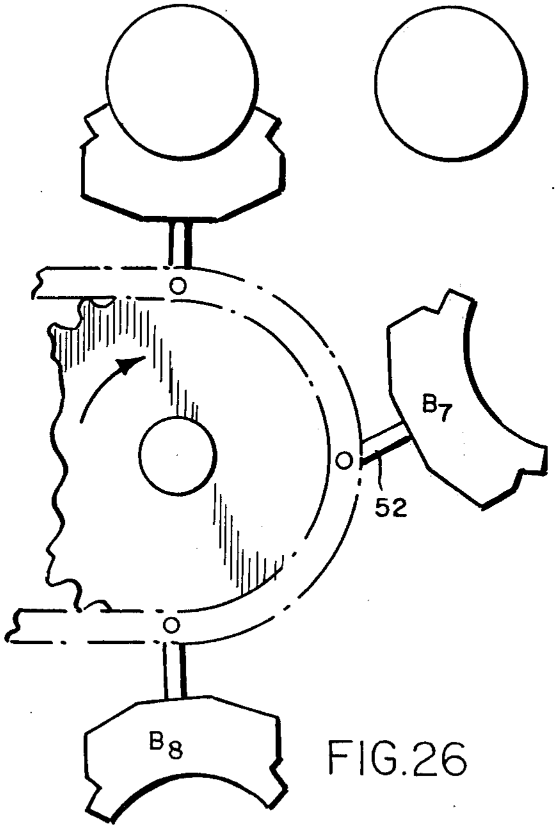

As has been previously indicated, it is desirable to maintain the pads in engagement with the containers for as long as possible but without unduly increasing the length of the conveyors, which increases the number of wiper assemblies that must be employed. To this end, the apparatus herein illustrated is designed to enable moving the wiper assemblies around the curved end of the conveyor leading into the straight run which is next to the conveyor 10 in such a way as to cause the wiper pads, as they are moved toward the conveyor 10 at the one end, to move perpendicularly and parallel thereto rather than angularly as they travel around the centers of the sprockets, so that the pads will have compressive engagement with the containers before they reach the centers of the sprockets at one end throughout the distance between centers and after they pass the centers of the sprockets at the other end and in such a way as to cause the wiper pads as they are moved away from the conveyor 10 at the other end to move parallel and perpendicularly thereto. This is achieved by design of the cam grooves 86*a*, 86*b* at their opposite ends as shown in FIGS. 9 and 10 to have portions 94*a* and 94*b*. The groove 86*a* has a gap 96*a* in it and the groove 86*b* has a gap 96*b* in it. As thus constructed, when the upper roller 76*a* reaches the gap 96*a* it leaves the groove 86*a* at approximately the point X and does not re-enter it until it reaches the point Y. During this period the lower roller 76*b* is traveling along the portion 94*a* which guides the wiper assembly as it travels around the end. Correspondingly, when the lower roller 76*b* reaches the gap 96*b* it leaves the groove 86*b* at substantially the point X' and does not re-enter it again until it reaches the point Y'. Thus, at one end the upper roller 76*a* is traveling in the air and the lower roller is guiding the wiper assembly and at the other end the lower roller is traveling in the air and the upper roller is guiding the wiper assembly. The contour of the cam portion 94*a* as illustrated in FIGS. 11 to 18 is such that as the wiper assembly travels along the cam portion 94*a* it is rotated forwardly about its pivots with respect to the chains in the direction of movement about that end, the result of which is to cause the pad to move around the end in a tighter circle than would otherwise be the case and as the wiper assembly reaches the latter part of its movement around the end to be so disposed that the arm 52 mounting the pad is substantially perpendicular to the path of movement of the container conveyor 10 so that the label applying pad while moving perpendicularly toward the container conveyor 10 is also traveling in planes substantially parallel to the container conveyor and hence becomes compressively engaged with the containers to apply total compression before it reaches the junction of the curved runs of the chains with the straight runs. From the position Ao to A1 the pad is accelerated and from the position A1 to the position A8 it is decelerating to the speed of the chain. FIGS. 11 to 18 show the successive positions of a pad A as it approaches and becomes engaged with the container on the container conveyor. FIG. 15 shows the arm 52 of a wiper assembly substantially perpendicular to the conveyor 10 shown diagrammatically before the wiper assembly reaches the centers C of the sprockets; FIG. 16, the initial contact of the pad with a container; FIG. 17, closing of the pad on the container and partial compression and FIG. 18, full compressive engagement with the container. The initial contact, closing of the pad about the container and initial compression all take place before the assembly reaches the center of the sprockets at that end, that is, the point of intersection of a perpendicular projection of the center of the sprocket on the center line of the conveyor 10. correspondingly, at the right end the portion 94*b* moves the pads B perpendicularly away from the path of travel of the container conveyor 10 while maintaining the pads substantially parallel to the conveyor. The contour of the cam portion 94*b* is such as to decelerate movement of the pad from the position B1 to approximately the position Bo and then to accelerate it from the position Bo to the position B8 to the speed of the straight run of the chain. FIG. 19 shows a pad fully engaged with the container at the centers of the sprockets at the ends of the straight runs. FIG. 20 shows the pads still fully engaged with the container after the pad has passed by the centers C of the sprockets. FIG. 21 shows the pad still moving in a plane substantially parallel to the container conveyor but with the pad open. FIG. 22 shows the pad withdrawn and FIGS. 23, 24, 25 and 26 show progressive deceleration of the pad about one half of the way around the end with the arm 52 disposed at an angle such that the pad lags the chains as it travels around that end. Movement of the wiper pads at the two ends in tighter circles about the centers of rotation of sprockets provides the advantage of a shorter radius which lowers the centrifugal forces developed. This enables operating the apparatus at high speeds without causing excessive vibration and without developing destructive forces and particularly the contour of the cam portions 94*a* and 94*b* is designed to effect transfer of the motion of the assemblies from the straight runs to the curved runs without sudden acceleration and deceleration. The design of the cam portion 94*a* is such that a pad gradually accelerates at the end around which it is traveling toward the container conveyor commencing when the cam roll 76*a* leaves the track 86*a* and continues to a maximum at about half way around the end and then decelerates to the speed of the straight run of the chain when it re-enters the groove 86*a* at the point Y. At the other end when the pad is moving away from the container conveyor when the cam roll 76 *b* leaves the cam groove 86*b* the pad moves away at a decelerated rate until it is approximately half way around the end and then is accelerated to the speed of the chain as it enters the cam groove 86*b* at the point Y'.

As will be seen by reference to FIG. 3, the bearing 34 for the sprockets 30 at the left hand of the wiper mechanism are supported by a bar 96 which is mounted to the left end of the frame member 36 and is secured thereto by screw bolts 102—102. Slots 104—104 are provided in the bar 96 to enable adjustment of the bar lengthwise of the frame and hence to adjust the distance between the bearings for the two shafts 32—32 which in turn enables adjusting the tension in the link chains traveling about the sprockets. A threaded screw bolt 106 threaded through a post 108 fixed to the frame with an end engaged with the bar 96 provides for effecting an initial adjustment. It is desirable to automatically take up slack in the chains without having to stop the machine and so there is mounted on the frame by means of a bracket 101, FIG. 30, a cylinder 103 containing a piston 105 which projects therefrom into engagement with the bar 96. The cylinder is connected by way of a check valve 107 with a conduit 109 which in turn is connected to a pressure lubricating system. Periodically oil under pressure is pumped into the lubricating system to effect lubrication of all the moving parts and at the same time oil is pumped through the check valve 107 into the cylinder 103 so as to extend the piston if, at that time, there is any slack, if there is no slack so that the piston cannot be displaced no oil will be forced into the cylinder.

The adjustment of the longitudinal spacing of the sprockets requires, of course, that the cam plates 82*a*–82*b* be correspondingly adjustable and this is provided for by dividing the cam plates intermediate their ends. The adjacent ends of the cam plates are beveled as shown in FIG. 3.

Figure 4:
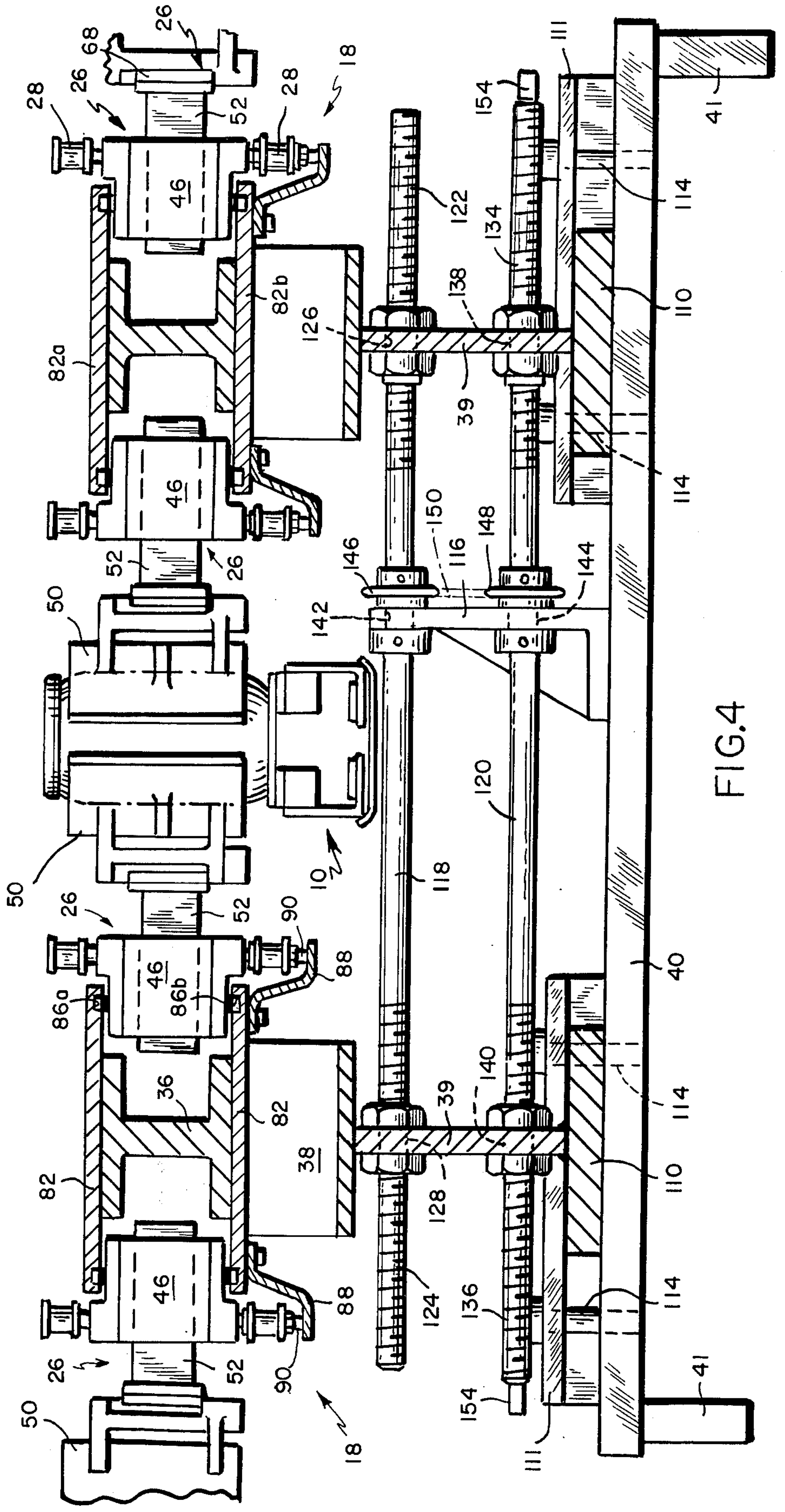
FIG. 4 is an elevation with parts in sections taken transversely of the apparatus on the line 4—4 of FIG. 3.

As previously related, the wiper mechanisms are mounted to be moved toward and from the opposite sides of the container conveyor 10. This is achieved by providing the frame members 39—39 with base flanges 110—110, FIG. 4, and attaching the flanges by gibs 111—111 to the table 40. Screw bolts 114 provide for clamping the flanges to the table and by backing off the screw bolts 114—114, the frame members 39—39 may be moved along the surface of the table 40 toward and from each other. A bracket plate 116, FIG. 4, is mounted on the table between the frame members 39—39 and these and the bracket plate 116 are provided with openings for receiving spaced parallel adjusting shafts 118—118 and a drive shaft 120. The adjusting shafts 118—118 have right and left hand threaded portions 122 and 124 threaded through threaded openings 126–128 in the frame members 39—39 and the drive shaft 120 has right and left hand threaded portions 134–136 engaged with threaded portions 138–140 in the frame members 39—39. The shafts 118—118 and 120 are freely rotatably in openings 142—142 and 144. Sprockets 146—146 are mounted on the shafts 118—118 and a sprocket 148 is mounted in the shaft 120. A chain 150 is entrained about the several sprockets and about an idler 152 mounted on the bracket plate 116. By rotation of the drive shaft 120 the frame members 39—39 may be moved toward or away from each other. Squared ends 154—154 are provided at the ends of the drive shaft 120 so that the adjustment can be made from either side of the apparatus.

The drive for the sprockets and hence for the conveyor chains is provided for by a flexible coupling 156, FIGS. 3 and 27, connected at one end to the lower end of the shaft 32 at the right end of the apparatus as shown in FIGS. 3 and 27 and at its lower end to a shaft 158 supported in a vertical position in a suitable bearing 160 at the upper side of the table 40 with a portion extending downwardly through the table on which there is fixed a large gear 162. To provide for uninterrupted continuous drive of the shafts 158—158 at the two sides of the machine while permitting adjustment of the assemblies the gears 162—162 are connected to a drive gear 178 by trains of gears 164, 166 and 168. The drive gear 178 is fixed to a stub-shaft 179, FIG. 28, mounted in a bearing 181 on the table 40 so as to extend downwardly through the table to the underside. The bearing 181 has an extension 183 at the underside of the table on which are rotatably mounted in overlapping relation hub members 185—185 from each of which extends an arm 187 comprising spaced links 189–191. The link 189 is fastened to the hub 185. The train of gears 164, 166, 168 is mounted between the links on pins 164*a*, 166*a* and 168*a* with the gear 168 in mesh with the gear 178. The gear 164 is held in mesh with the gear 162 by spaced links 193, 195 pivotally connected at one end to the pin 164*a* and at their other ends to the shaft 158. The drive gear 178 is loose on the shaft 179 and is connected by a slip coupling comprising diametrically disposed balls 178*a*—178*a* and a spring 178*b* to a gear 197 keyed to the shaft 179 in mesh with a gear 199, FIG. 29. The gear 199 is fixed to the output shaft 180 of a beveled gear box (1 to 1 ratio) 182 and the latter is connected by a coupling 184 to the output side of a speed regulating assembly 186 disclosed in my pending application and hence will not be described herein. The articulated connection between the links permit the gears 162—162 to be moved toward and from each other along a straight line passing through their centers. In the event of jamming the balls will force the gear 178 downwardly without disengaging it from the gear 168 against a switch S1 to stop the machine.

The shaft 202 from the gear box 182 is the main drive shaft and has on it a pulley 204 which drives a pully 206. Pulley 206 is fixed to a counter shaft 208 and the latter in turn drives a pulley 210 which drives the container conveyor 10 as shown in U.S. Pat. No. 2,940,630.

In the operation of the apparatus containers supplied to the conveyor 10 are moved lengthwise of the apparatus at a spacing determined by the feed screws between the label applying turrets where labels with adhesive applied thereto are spotted on the sides of the containers by means of label carrying pads on the turrets between a pair of conventional rotary type wipers which apply wiping pressure to the labels and following this they are moved between the wiper mechanisms of this invention where the wiper assemblies moving in synchronism with the conveyor in timed relation with the arrival of containers in position for application of labels thereto, to apply full pressure to the sides of the containers and hence the labels along the entire distance from center to center of the sprockets for maximum application of pressure and maximum length of time of application of pressure. The apparatus as thus described is capable of labeling of 600 to 850 containers per minute without vibration and without creating destructive forces in the operating mechanism and further provides for holding the labels engaged with the containers for a sufficient length of time to insure that they adhere thereto without employing excessively long conveyors for supporting the label applying assemblies and hence without an unnecessary number of wiper assemblies which are relatively expensive and which must be stocked in various forms for labeling bottles of different size and shape.

It should be understood that the present disclosure is for the purpose of illustration only and includes all modifications or improvements which fall within the scope of the appended claims.

I claim:

1. In a labeling machine wherein there is a first conveyor for moving containers standing upright thereon along a predetermined path, a second conveyor having a straight run parallel to the first conveyor and curved runs leading into and away from the straight run, label pressing assemblies pivotally mounted on the second conveyor at intervals corresponding to the spacing of the containers on the first conveyor, means operative as the assemblies approach the curved end leading into the straight run for rotating the assemblies progressively forward a predetermined angular distance relative to the direction of movement of the second conveyor so as to decrease the radius of travel of the assembly about the end for effecting smooth transition from the linear movement along the straight run to the curvilinear movement about the end, reduce the centrifugal forces developed and initiate early engagement of the assemblies with the containers on the first conveyor and means operative as the assemblies approach the curved end leading away from the straight run for rotating the assemblies progressively rearwardly a predetermined angular distance relative to the direction of movement of the second conveyor so as to decrease the radius of travel of the assemblies about the end, to effect smooth transition from the linear movement of the assemblies along the straight run to the curvilinear movement about the end, reduce the centrifugal forces developed and prolong engagement of the assemblies with the containers on the first conveyor.

2. Apparatus according to claim 1, wherein said means are cam tracks having surfaces extending along the curved and straight runs of the conveyor and cam followers on the assemblies engaged with said surfaces and wherein one of the cam tracks guides the assemblies about the end leading into said first conveyor and the other guides the assemblies about the end leading away from said first conveyor.

3. Label applying apparatus, comprising means for moving containers to be labelled in spaced relation along a predetermined path, a conveyor mounted at each side of said path of movement of the first named means, each conveyor having a straight run parallel to said path and curved runs at opposite ends, label pressing assemblies, means pivotally mounting the label pressing assemblies on the conveyors at intervals corresponding to the container spacing for movement with the conveyors around one end toward said path and around the other end away from said path, label pressing pads on the assemblies for pressing labels against containers, means for advancing the conveyors and first means to move the pads into engagement with the successive containers, means at the ends around which the assemblies are moved towards said path and away from said path for rotating the assemblies relative to the first named means to cause the pads to be moved perpendicularly towards and away from said path and parallel thereto and support means for supporting the conveyors for rectilinear movement toward and away from the first named means including longitudinally spaced adjusting screws provided with left and right hand threads threaded into the respective support means at the opposite sides of said first named means so that rotation of the screws will move the support means, a drive screw provided with left and right hand threads, threaded into the respective support means intermediate the adjusting screws, sprockets fixed to the several screws and chains entrained about the sprockets and means for rotating the drive screw and through the chains the adjusting screws.

4. Apparatus according to claim 3, comprising means supporting one shaft and the sprockets thereon for longitudinal movement relative to the other shaft and sprockets to enable adjusting the distance between the sprockets.

5. Label applying apparatus comprising means for moving containers to be labelled in spaced relation along a predetermined path, an endless conveyor having a straight run parallel to and adjacent said path and curved end runs which lead into and away from the straight run, label pressing assemblies including label pressing pads, means pivotally mounting the label pressing assemblies on the conveyor for pivotal movement about vertical axes with the wiper pressing pads projecting horizontally outwardly from the conveyor for movement therewith around one end run towards said straight run and around the other end run away from said straight run, means slidingly mounting the label pressing pads on the assemblies, spring means holding the label pressing pads distended relative to the assemblies for pressing the labels against the containers, means for advancing the conveyor and first means to move the label pressing pads into engagement with successive containers and cam means at the ends around which the assemblies are moved towards said pads and away from said pads for rotating the assemblies relative to the conveyor as they travel around the one end towards said path to cause the pads to be moved perpendicularly toward and parallel to said path into engagement with the containers travelling along said path and at the other end to be moved parallel to and perpendicularly away from said path out of engagement with the containers, said cam means comprising two cam rolls mounted on each assembly inwardly of its pivot axis and symmetrical with respect thereto and two cam grooves having straight and curved runs with which the cam rolls are respectively engaged and wherein one of the cam grooves contains a gap at one end and the other a gap at the other end such that a single cam controls the relative movement of the assemblies at each end.

6. In a label applying apparatus, a container conveyor for moving containers standing upright and in spaced relation along a predetermined straight path, vertically spaced chains supported for movement in horizontal planes with straight runs parallel to the container conveyor, and curved end runs leading to and from the straight runs, wiper assemblies including label pressing pads pivotally supported on said chains for pivotal movement about vertical axes with the wiper pressing pads projecting horizontally outwardly from the chains, vertically spaced cam plates and vertically spaced cam rolls on the assemblies engaged respetively with the cam plates, one of the cam rolls operating to guide the assemblies around the end of the conveyor toward the container conveyor and the other operating to guide the assemblies around the end of the conveyor away from the container conveyor, said cams being contoured at the ends to cause the assemblies to be moved perpendicularly toward and away from the container conveyor.

7. Label applying apparatus with driving means for moving containers to be labelled in spaced relation along a predetermined path, a conveyor having straight runs parallel to said path and curved runs at its opposite ends, label pressing assemblies, means pivotally mounting the label pressing assemblies on the conveyor and facing outwardly thereon at intervals corresponding to the container spacing for movement with the conveyor around one end towards said path and around the other end away from said path, label pressing pads, means slidingly mounting the label pressing pads on the assemblies, spring means holding the label pressing pads extending relative to the assemblies for pressing the labels against the containers, means for advancing the conveyor and first means to move the pads into engagement with successive containers, means at the end around which the assemblies are moved towards said path for rotating the assemblies relative to the conveyor to cause the pads to be moved perpendicularly towards said path and parallel thereto while moving in translation towards the straight run and means at the end about which the assemblies travel away from the path for rotating the assemblies relative to the conveyor to cause the pads to travel perpendicularly away from said path in planes substantially parallel thereto, said means comprising two cam rolls mounted on each assembly inwardly of its pivot axis and symmetrical with respect thereto and two cam grooves having straight and curved runs with which the cam rolls are respectively engaged and wherein said cam grooves are designed to cause the pads to travel along a curved path at the ends of lesser radius of curvature than if not so located.

8. Apparatus according to claim 7, wherein said means for rotating the assemblies relative to the conveyor causes the pads to lead the assemblies in the direction of movement.

9. Apparatus according to claim 7, wherein there is means at the end about which the assemblies travel away from the path for rotating the label pressing assemblies relative to the conveyor which operates to maintain the pads in full compressive engagement with the containers all the way to the end of the straight run.

10. Apparatus according to claim 7, wherein there is means at the end about which the assemblies travel away from the path for rotating the label pressing assemblies relative to the conveyor which operates to maintain the pads closed about the containers beyond the end of the straight run.

11. Labelling apparatus comprising means for moving containers to be labelled in spaced relation along a predetermined path, a conveyor having a straight run parallel to said path and curved runs at its opposite ends, label pressing assemblies, means pivotally mounting the label pressing assemblies on the conveyor facing outwardly thereon at intervals corresponding to the container spacing for movement with the conveyor around one end towards said path and around the other end away from said path, label pressing pads, means slidingly mounting the label pressing pads on the assemblies, springs means holding the label pressing pads yieldably extended relative to the assemblies for pressing labels against the containers, means for advancing the conveyor and first means to move the pads into engagement with successive containers and cam means at the end around which the assemblies are moved toward said path for rotating the assemblies relative to the conveyor to cause the pads to be moved perpendicularly toward said path and parallel thereto while moving in translation towards the straight runs, comprising two cam rolls mounted on each assembly inwardly of its pivot axis and symmetrical with respect thereto and two cam grooves having straight and curved runs with which the cam rolls are respectively engaged and wherein one of the cam grooves contains a gap at one end and the other a gap at the other end such that a single cam roll controls relative movement of the assemblies at each end.

12. Apparatus according to claim 11, wherein the traveling cam roll is trailing along the gap around the end that the assembly travels toward the container conveyor and the leading cam roll is traveling along the gap around the end that the assembly travels away from the container conveyor.

13. Apparatus according to claim 11, wherein the pads are caused to have an initial engagement with the containers before reaching the point of perpendicular projection of the center of the curved run on the straight run.

14. Apparatus according to claim 11, wherein the pads are articulated and are caused to be closed about the containers before reaching the point of perpendicular projection of the center of the curved run on the straight run.

15. Apparatus according to claim 11, wherein said yieldably distended pads are caused to be partially displaced by initial engagement of the pads with the containers before they reach the point of perpendicular projection of the center of the curved run on the straight run.

16. Apparatus according to claim 11, wherein said yieldably distended pads are caused to become fully compressively engaged with the containers before they reach the point of perpendicular projection of the center of the curved run on the straight run.

17. Apparatus according to claim 11, wherein the means for effecting rotation of the assemblies and hence the pads relative to the conveyor operates to initiate acceleration of the assemblies as they approach the ends around which they are traveling toward the container conveyor and to continue such acceleration up to approximately one half the way around said end and then to decrease their acceleration to the speed of the straight run at the junction of the curve run with the straight run.

18. Apparatus according to claim 11, wherein the means for effecting rotation of the assemblies and hence the pads pads relative to the conveyors operates to initiate a uniform acceleration of the assemblies as they approach the curved run at the one end and to initiate a uniform deceleration as they approach the curved run at the other end.

19. Apparatus according to claim 11, wherein the means for effecting rotation of the assemblies and hence the pads relative to the conveyor operates to initiate deceleration of the assemblies as they approach the end along which they travel away from the container conveyor and continue such deceleration up to approximately one half of the way around said end and then accelerates them to the speed of the straight run at the junction of the curved run with the straight run.

20. Apparatus according to claim 11, comprising in combination a preceding label applying apparatus for pressing labels against containers traveling along said path and wherein the label pressing assemblies on the conveyors are constructed and arranged to press the ends of the previously applied labels to the containers.

21. Apparatus according to claim 11, wherein there is means coextensive with the straight run of the conveyor along which the pads are moving in compressive engagement with the containers supporting said straight run against lateral displacement.

22. Apparatus according to claim 11, wherein there is means coextensive with the straight runs of the conveyor supporting the latter in horizontal planes.

* * * * *